UNITED STATES PATENT OFFICE.

HENRY LOWE, OF BALTIMORE, MARYLAND.

IMPROVEMENT IN THE MANUFACTURE OF CAUSTIC SODA.

Specification forming part of Letters Patent No. 32,523, dated June 11, 1861.

*To all whom it may concern:*

Be it known that I, HENRY LOWE, of the city and county of Baltimore, in the State of Maryland, have invented an Economy in the Production of Caustic Soda, of which the following is a specification.

My invention consists in reclaiming the lime from the manufacture of caustic soda. The following is a description of the same: After boiling the solution of carbonate of soda (soda-ash) with the caustic lime the solution is drained off, and the carbonate of lime formed from the decomposition with the soda is drained sufficiently dry, and then pressed in molds in a suitable machine. I prefer a dry-clay-brick machine, and would recommend the one invented by I. W. Crary, Pensacola, Florida. The carbonate of lime being pressed into bricks, build them in a lime-kiln and burn the same as when stone-lime is operated on.

I do not broadly claim the precipitation of lime as a carbonate and the recovery of caustic lime therefrom; but I believe the above-described mode of molding and burning artificial carbonate of lime is new, and a substantial improvement in the manufacture of soda.

What I claim as new, and desire to secure by Letters Patent of the United States, is—

The molding and burning of artificial carbonate of lime, substantially in the manner and for the purposes set forth.

HENRY LOWE.

Witnesses:
LEWIS ADLER,
JAS. H. HARRIS.